(12) United States Patent
Hornischer et al.

(10) Patent No.: US 10,988,085 B2
(45) Date of Patent: Apr. 27, 2021

(54) MOTOR VEHICLE

(71) Applicant: AUDI AG, Ingolstadt (DE)

(72) Inventors: Jörg Hornischer, Wettstetten (DE);
Bernhard Enslinger, Neumarkt i.d.
OPf. (DE)

(73) Assignee: Audi AG, Ingolstadt (DE)

( * ) Notice: Subject to any disclaimer, the term of this patent is extended or adjusted under 35 U.S.C. 154(b) by 147 days.

(21) Appl. No.: 16/480,358

(22) PCT Filed: Nov. 15, 2017

(86) PCT No.: PCT/EP2017/001335
§ 371 (c)(1),
(2) Date: Jul. 24, 2019

(87) PCT Pub. No.: WO2018/137749
PCT Pub. Date: Aug. 2, 2018

(65) Prior Publication Data
US 2019/0381943 A1 Dec. 19, 2019

(30) Foreign Application Priority Data
Jan. 25, 2017 (DE) ..................... 10 2017 000 637.7

(51) Int. Cl.
*B60R 7/06* (2006.01)
*E05D 15/22* (2006.01)

(52) U.S. Cl.
CPC ................ *B60R 7/06* (2013.01); *E05D 15/22* (2013.01); *E05Y 2900/538* (2013.01)

(58) Field of Classification Search
CPC .. B60R 7/06; B60R 7/04; E05D 15/22; E05Y 2900/538
(Continued)

(56) References Cited

U.S. PATENT DOCUMENTS

| 6,116,674 A | 9/2000 | Allison et al. |
| 7,543,874 B2 * | 6/2009 | Ogura ....................... B60R 7/04 296/24.34 |

(Continued)

FOREIGN PATENT DOCUMENTS

| DE | 102005060974 A1 | 6/2007 |
| DE | 112014004692 T5 | 7/2016 |

(Continued)

OTHER PUBLICATIONS

International Search Report and Witten Opinion of the International Searching Authority directed to related International Patent Application No. PCT/EP2017/001335, dated Feb. 12, 2018, with attached English-language translation; 14 pages.
(Continued)

*Primary Examiner* — Pinel E Romain
(74) *Attorney, Agent, or Firm* — Sterne, Kessler, Goldstein & Fox P.L.L.C.

(57) ABSTRACT

The present application relates to a motor vehicle comprising at least two seats and, located between these seats, a storage compartment which has a base, a front wall, a rear wall, and two side walls, wherein one or both side walls can be moved between a lowered position, laterally opening the storage compartment, and a raised position, laterally closing the storage compartment.

13 Claims, 5 Drawing Sheets

(58) Field of Classification Search
USPC .......................................................... 296/37.8
See application file for complete search history.

(56) References Cited

U.S. PATENT DOCUMENTS

| | | |
|---|---|---|
| 9,925,926 B2 | 3/2018 | Flothmann et al. |
| 2009/0115215 A1* | 5/2009 | Abro ........................ B60R 7/04 296/24.34 |
| 2010/0090491 A1 | 4/2010 | Hipshier et al. |
| 2010/0156131 A1* | 6/2010 | D'Alessandro ........... B60R 7/04 296/37.8 |
| 2011/0068598 A1* | 3/2011 | Penner .................... E05B 83/32 296/37.8 |
| 2016/0059790 A1 | 3/2016 | Perelli et al. |
| 2016/0250978 A1 | 9/2016 | Suzuki et al. |

FOREIGN PATENT DOCUMENTS

| | | |
|---|---|---|
| DE | 102015002758 A1 | 9/2016 |
| GB | 2508430 A | 6/2014 |
| JP | 2009/154552 A | 7/2009 |

OTHER PUBLICATIONS

International Preliminary Report on Patentability directed to related International Patent Application No. PCT/EP2017/001335, dated Jan. 4, 2019, with attached English-language translation; 10 pages.

* cited by examiner

MOTOR VEHICLE

TECHNICAL FIELD

The present application relates to a motor vehicle comprising at least two seats and, located in the footwell in front of the seats, a storage compartment, which has a base, a front wall, a rear wall and two side walls, wherein one or each side wall of the storage compartment can be moved between a lowered position, laterally opening the storage compartment, and a raised position, laterally closing the storage compartment.

BACKGROUND

The center console in motor vehicles provides a practical solution for stowing various objects. The elimination of the center console, such as on vehicles lacking a center tunnel as in vehicles with an electric drive, provides, on one hand, the sensation of a larger available space, while omitting one of the most important places for storing objects within the vehicle. In order to allow a possible stowage in such vehicles, two very low side walls are also provided, which laterally delimit a storage compartment. With such low side walls, however, there is the risk, that while driving, the objects which are stowed in the storage compartment may fall out of the same. The falling out of objects into the footwell of the driver may cause a considerable risk for safety. In order to prevent such falling out, it is possible to provide the storage surfaces with corresponding lids. This however negatively impacts the feeling of space which is due to the presence of a flat storage surface, which is open at the top and is not delimited or is delimited laterally at a very low height.

DE 10 2015 002 758 A1 describes a blind for closing a storage compartment in a center console of a motor vehicle. The blind is designed so that its blades in the closed position cover the lateral guides, in which the blind is guided.

DE 11 2014 004 692 T5 describes a container, which is used for example for a center console case of a vehicle. Among other things, the base wall and the side walls are integrally formed as a single component and thus connected via integral hinges. The container is designed so that in the open state, if forces are acting laterally or from above, it avoids that stresses are applied onto the integral hinge.

The document GB 2508430 A discloses a container for the center console of a motor vehicle, which consists of a lower and an upper container part, wherein the total height of the container can be adjusted by moving the two container parts relative to each other. In addition, the upper part has a sliding cover.

U.S. Pat. No. 6,116,674 discloses a container which can be disposed at various locations within a motor vehicle and which can be fastened to the mounts of the vehicle seats. The container has rigid side walls and a hinged lid and in its front region an opening which can be closed by a blind.

US 2016/0059790 A1 discloses a mat for the floor of a trunk in a motor vehicle, wherein the mat is formed in such a way that it is provided with a plurality of surfaces, which can be folded out and which together in the erected state, form a container in the trunk. Moreover, this publication also discloses corresponding erectable containers also for other positions within the motor vehicle, such as the footwells in front of the seats of the motor vehicle.

US 2010/0090491 A1 discloses a storage compartment for a motor vehicle, which is arranged in a center console of a motor vehicle and comprises two roller doors. The roller doors are each movable and can cover a side wall of the storage compartment.

BRIEF DESCRIPTION OF THE DRAWINGS/FIGURES

DETAILED DESCRIPTION

Figure 1:
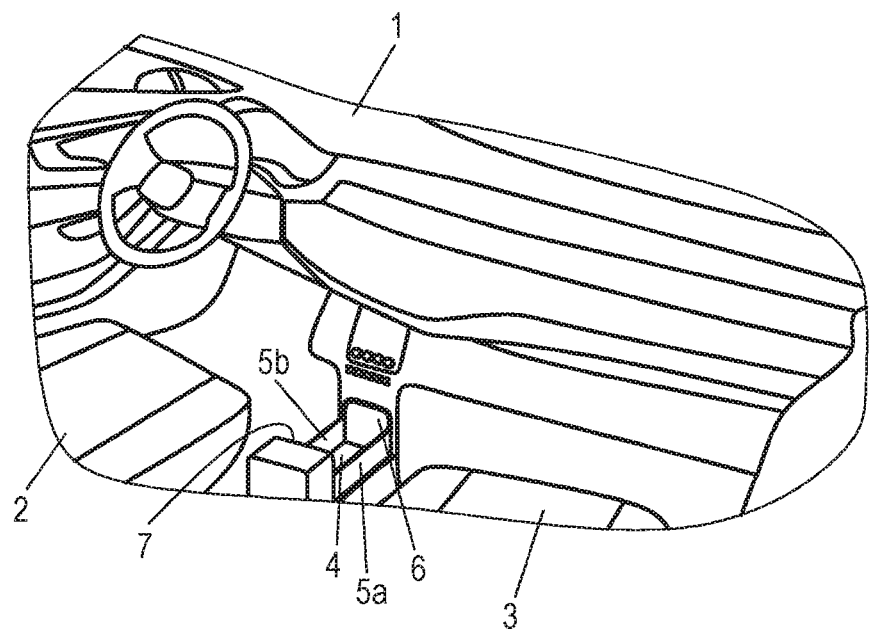
FIG. 1 shows an interior view of a motor vehicle, in accordance with some embodiments.

The object of the present application consists in providing a motor vehicle, which both offers an open spatial feeling and provides a suitable storage solution.

In order to achieve said object, in a motor vehicle of above said type, according to the invention, it is provided that the side walls are movably coupled to each other.

In accordance with some embodiments, the side walls are arranged between the front wall and the rear wall of the storage compartment, wherein the terms "front wall" and "rear wall" has to be considered in relation to the driving direction of the motor vehicle. One or both side walls may have a variable height, i.e. the height thereof is adjustable. When the side surfaces of the storage compartment are open, i.e. when the side wall or the side walls are moved in the lowered position, a large space may be perceived, whereas when the side wall or the side walls are raised, a safe transport of objects stowed in the storage compartment is allowed.

In accordance with some embodiments, one or each side wall of the storage compartment can be individually adjusted at a desirable height and can be adapted to the requirements of the passengers, in relation to the spatial perception. Moreover, a falling out of objects from the storage compartment can be prevented, when the side wall or the side walls are in a raised position.

In accordance with some embodiments, the storage compartment can be provided with two movable side walls or with one movable side wall, which is fixed at a determined height in an unmovable way.

In accordance with some embodiments, in order to allow a directional movement, it is provided that one or each movable side wall is guided in guide rails provided on the front wall and on the rear wall. The guide rails can be a separate component and can be fastened to the front or rear wall or they can be directly integrated into the wall, such as in the form of a groove. Due to this arrangement and to the form of the guide rails, the position of the side wall guided thereby is predetermined in the extracted position, wherein in an embodiment having two movable side walls, the side walls can be directed parallel or at any desirable angle relative to each other.

In accordance with some embodiments, each side wall may be rigid or flexible. Upon opening, a rigid side wall may be lowered in a downwards direction into a shaft. The shaft can be configured in such a way that it guides the side wall, so that no further guide rails have to be provided for the same.

Each flexible side wall may be made of a flexible plastics material and/or can be formed as a blind, which is composed of blades, which are movably fastened to each other. A flexible side wall made of plastics material can be provided with an edge, which allows the flexible side wall to be guided in the guide rails. In case of a blind-like side wall, this function may be provided by the blades of the blind.

Regardless of how a side wall is produced or constructed, it can either be movable or fastened at a certain height.

In accordance with some embodiments, the storage compartment can be configured in such a way that one or each side wall, when moving in the raised position, can be deflected and moved over the storage compartment. The deflection occurs for example by means of correspondingly shaped guide rails. Depending on the profile and the arrangement of the guide rails, different shapes of the cross section of the closed storage compartment are possible, such as rectangular, semicircular or as a peaked roof. Such a configuration allows the storage compartment to be closed in an upward direction. Such a closed storage compartment provides, for example, a visual protection of valuable items, which are stowed therein. Moreover it is possible to provide the inner space with a cooling system, which allows a cooling of food or beverages which are arranged within the storage compartment.

In accordance with yet another embodiment, one or each side wall, upon movement in lowered position laterally opening the storage compartment, can be moved under the compartment base and/or can be wound on a roller. The flexible side walls according to the first alternative can be guided so that after a lateral deflection they can be arranged under the compartment base parallel thereto. In accordance with some embodiments, it is possible to wind the flexible side walls on each roller, wherein the rollers can also be located under the compartment base. The guide of the side walls under the compartment base can occur in this case by correspondingly shaped guide rails.

In accordance with some embodiments, the compartment base, which limits the storage compartment downwards, can for example be concavely curved on its upper side or be provided with other structures facilitating the transport of objects, such as cup holders or the like.

In accordance with some embodiments, the storage compartment may be designed with respect to the opening and closing so that one or each side wall can be moved manually or electromotively, wherein one or each manually movable side wall has a handle. This handle may for example be attached to the upper end in the surface of the blind. In case of an electromotive movement, electric motors with appropriate control are provided, through which the side walls can be moved. The triggering of the movement of the side walls can occur, for example, by a switch, a button or a touch screen in the interior of the motor vehicle. Other possibilities include controlling the movement of the side walls by gestures and voice commands as well as any combination of said possibilities.

The movement of the side wall or the side walls can occur continuously or in any number of stages. This makes it possible to selectively fix them in different, raised positions or heights between the open and the closed position depending on the needs of the vehicle occupants. An electromotive movement of the side walls offers the advantage that the position or the height of the side wall can be arbitrarily set, so that each position can be approached and maintained by means of the electric motor. In case of manual mobility of one or both side walls, a locking of the side wall height in any number of stages can be performed, for example, by means of a latching, which can advantageously occur in the region of the guide rails or on one of the gear wheels of the gear mechanism described in the following.

In accordance with some embodiments, the opening and closing of the side walls may be made comfortable when the two movable side walls are movably coupled to each other. In this case, where there is a manual or electromotive movement of one side wall, the second side wall is moved along therewith. Depending on the configuration of the movable coupling, a synchronous operation or, for example, in case of different heights of the side walls, an operation with such a speed difference is possible, that the side walls simultaneously reach the open or the closed position.

In accordance with some embodiments, the above described motion coupling may be achieved in which the side walls are coupled to each other via a gear mechanism. This is possible both with electrical and manual movement of the side walls. Furthermore, if two movably coupled side walls are present, only one electric motor is necessary for their electric drive.

The motion coupling can be configured, regardless of whether the side walls are manually or electromotively movable, such that the gear mechanism includes gear racks, which are connected to the side walls, and which are coupled to each other by means of one or more gear wheels. By moving the gear wheels, thus also the racks are moved, and with them the side walls, which are attached thereto, which, for example, when opening the compartment, can be guided in parallel under the compartment base.

In accordance with yet another embodiment, the gear mechanism couples two rollers, onto which the side walls can be wound, and has a hollow gear stage. In this case, the gear mechanism is designed such that the desired movement coupling between the side walls is obtained via a corresponding motion coupling of the rollers. The hollow gear stage of the gear mechanism fulfills the purpose of avoiding that the gear wheels mesh with the rollers always at the same teeth. Due to the hollow gear, all teeth of the gear wheels of the gear mechanism are stressed evenly, which allows for an increased operating life of the gear mechanism.

In accordance with some embodiments, the storage compartment can be arranged in the motor vehicle, such that the front wall and/or the rear wall are integrated in the center console of the vehicle. Alternatively the storage compartment can also be mounted in the footwell in front of a first and/or any other rear seat.

Further advantages and details of the present application will become apparent from the exemplary embodiments described in the following and with reference to the figures.

FIG. 1 shows an interior of a motor vehicle, in accordance with some embodiments. As shown in FIG. 1, the interior of the motor vehicle, in which the storage compartment 4 is arranged in the footwell in front of the seats 2 and 3. The storage compartment 4 has two side walls 5a, 5b. The front wall 6 and the rear wall 7 of the storage compartment 4 are integrated in the center console of the motor vehicle.

Figure 2:
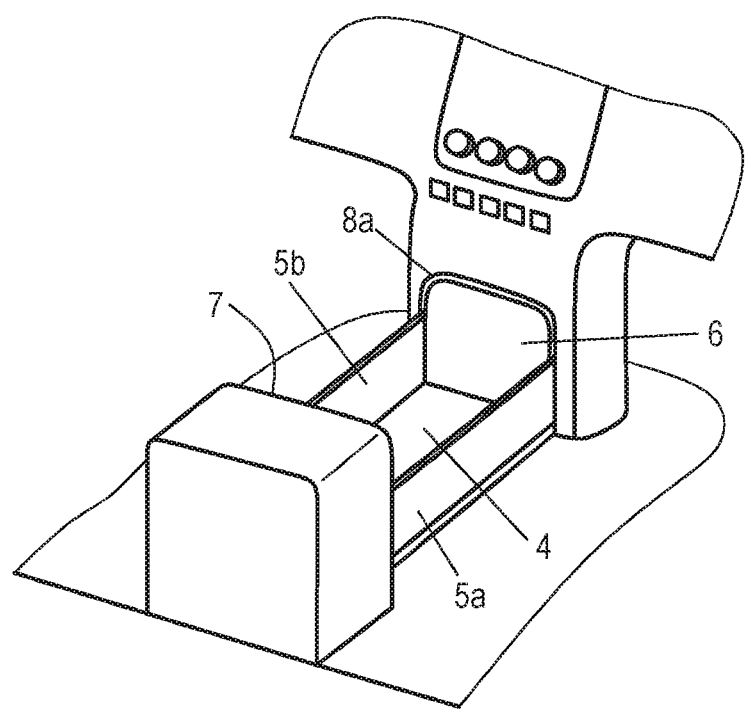
FIG. 2 shows a perspective view of a storage compartment with two movable side walls, in accordance with some embodiments.

FIG. 2 shows a perspective view of a storage compartment with two movable side walls, in accordance with some embodiments. FIG. 2 shows an enlarged view of the storage compartment 4 of FIG. 1 with two movable side walls 5a, 5b, which are mounted between the front wall 6 and rear wall 7, which are integrated in the center console. The side walls 5a, 5b are guided in a guide rail 8a integrated in the front wall 6 and in the guide rail 8b shown in FIG. 3, which is integrated in the rear wall 7. Both side walls 5a, 5b consist of a flexible material, such as a 3 mm to 5 mm thick plastics material, and are in a partially raised position, for example at a height of about 15 cm. The total height of the compartment with completely closed side walls is approximately 20 cm in this example.

Figure 3:
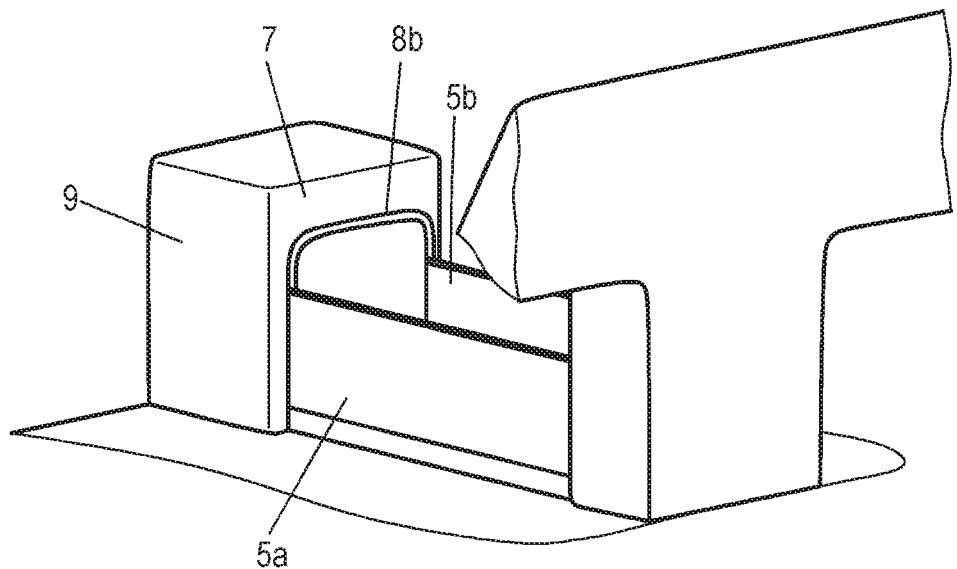
FIG. 3 shows a perspective view of a storage compartment with two movable side walls, in accordance with some embodiments.

FIG. 3 shows a perspective view of a storage compartment with two movable side walls, in accordance with some embodiments. Specifically, FIG. 3 shows the storage compartment with two movable side walls from a different angle of view. The guide rail 8b shown in FIG. 3 is integrated into the rear wall 7 of the storage compartment, which in turn is integrated into a structure of the center console 9. The guide rail 8b is in this case is shaped in the same way as the guide rail 8a of FIG. 2. Both guide rails 8a and 8b are arranged parallel to one another on the front wall 6 and the rear wall 7.

Figure 4A:
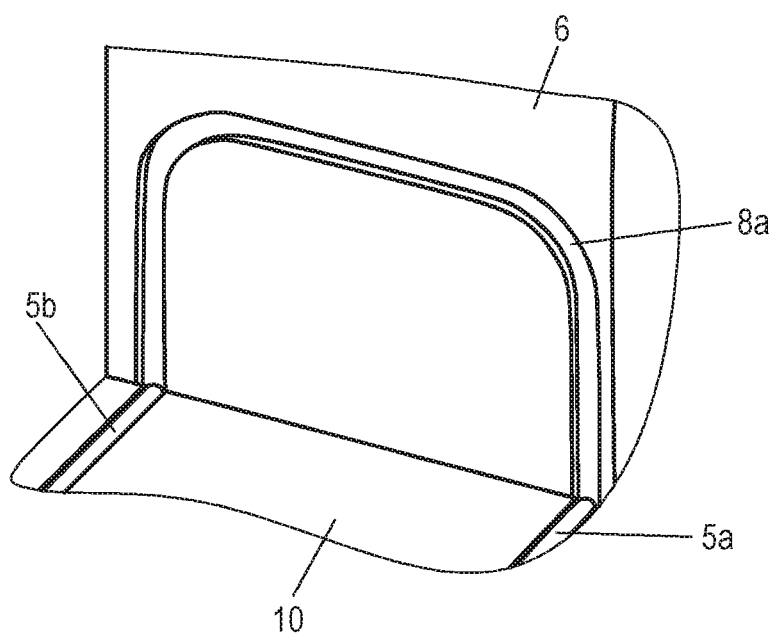
FIG. 4a shows a detailed perspective view of a guide rail integrated in a front or rear wall having lowered side walls, in accordance with some embodiments.

FIG. 4a shows a detailed perspective view of a guide rail integrated in a front or rear wall having lowered side walls, in accordance with some embodiments. As shown in FIG. 4a, the profile of the guide rail 8a, which is integrated in the front wall 6, is shown in an enlarged view. The side walls 5a, 5b are in a lowered position, so that their upper edges are flush with the sides of the compartment base 10. The guide rail 8a is shaped such that side walls 5a and 5b of flexible material can be raised beyond the illustrated lowered position. The side walls 5a, 5b are configured such that their lateral edges are guided by the guide rail 8a and by the guide rail 8b, which is mounted on the opposite rear wall.

Figure 4B:
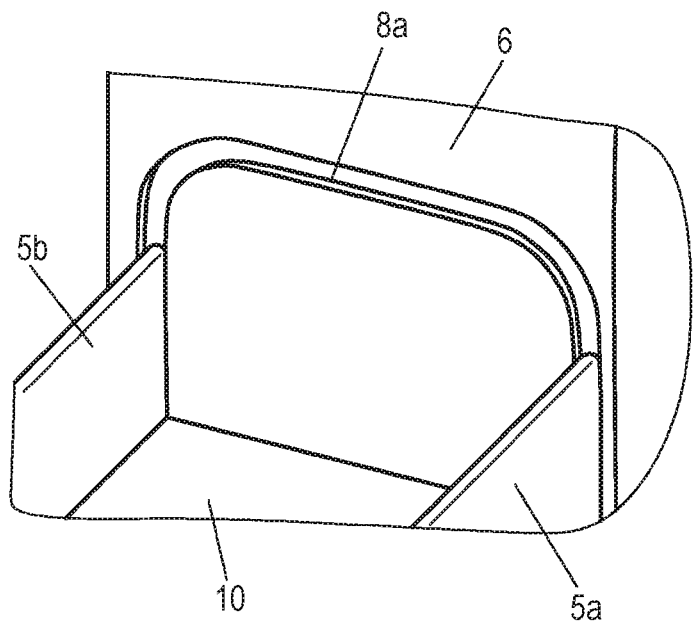
FIG. 4b shows a detailed perspective view of side walls in a raised position, in accordance with some embodiments.
Figure 4C:
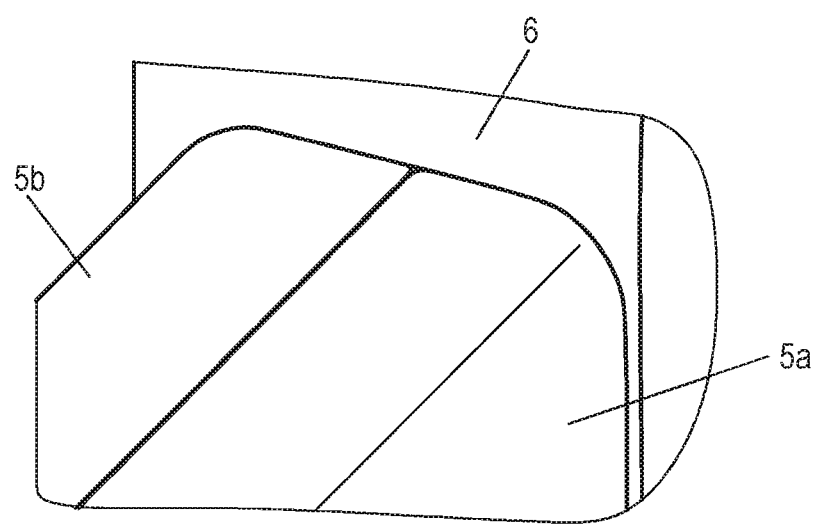
FIG. 4c shows a detailed perspective view of side walls closing the storage compartment, in accordance with some embodiments.

FIG. 4b shows a detailed perspective view of side walls in a raised position, and FIG. 4c shows a detailed perspective view of side walls closing the storage compartment, in accordance with some embodiments. As shown in FIG. 4b, the side walls 5a, 5b are in a raised position. Upon further raising of the side walls 5a, 5b, these are subject to a deflection due to the shape of the guide rail 8a, so that they are guided in parallel to the compartment base 10 out and close the storage compartment upwards, as shown in FIG. 4c. Depending on how the guide rail 8a, or the guide rail 8b, not shown in the FIGS. 4a to 4c, are formed, various cross-sectional geometries of the closed storage compartment can be realized. For example, a semi-circular or a triangular cross-section is possible, in addition to the geometry, which is parallel to the compartment base in the upper portion. Moreover, it is not required that the guide rails 8a and 8b have the same geometry.

Figure 5A:
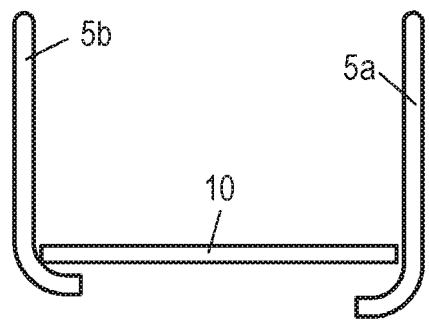
FIG. 5a shows a sectional view of a storage compartment having two side walls, in accordance with some embodiments.

FIG. 5a shows a sectional view of a storage compartment having two side walls, in accordance with some embodiments. Specifically, FIG. 5a shows two side walls, which are guided in parallel under the compartment base in the raised position. FIG. 5a shows a schematic diagram in which the side walls 5a, 5b are guided in parallel under the compartment base 10. The side walls 5a, 5b are in a raised position. The front and the rear wall and the guide rails, in which the side walls 5a, 5b are guided, are not shown. The side walls 5a, 5b are made, for example, of a flexible plastics material, or are formed as blinds composed of various blades. The guide of the side walls 5a, 5b under the compartment base 10 and on the side and/or over the compartment occurs by correspondingly shaped guide rails.

Figure 5B:
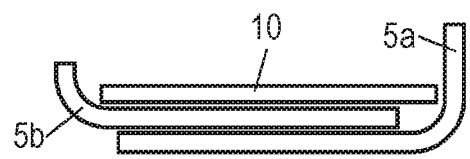
FIG. 5b shows a sectional view of a storage compartment having two side walls, in accordance with some embodiments.

FIG. 5b shows a sectional view of a storage compartment having two side walls, in accordance with some embodiments. Specifically, FIG. 5b shows two side walls, which are guided in parallel under the compartment base in the lowered position. FIG. 5b shows a schematic representation according to FIG. 5a with lowered side walls, which are guided one above the other. Upon movement of the side walls 5a, 5b from the illustrated, lowered position to a further raised position, as shown in FIG. 5a, the portion of the side walls 5a, 5b guided in parallel under the compartment base 10 is accordingly shortened.

Figure 6A:
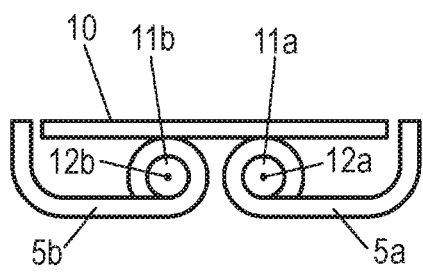
FIG. 6a shows a sectional side view of a storage compartment, in accordance with some embodiments.
Figure 6B:
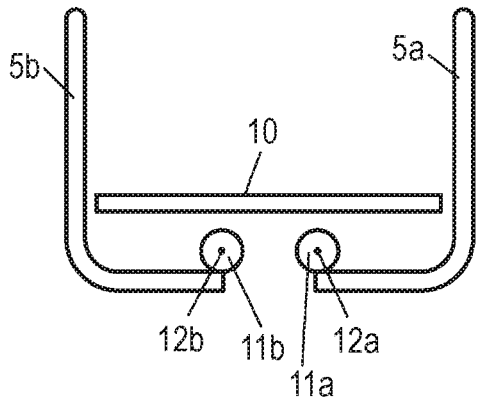
FIG. 6b shows a sectional side view of a storage compartment, in accordance with some embodiments.

FIG. 6a and FIG. 6b show a sectional side view of a storage compartment, in accordance with some embodiments. Particularly, FIG. 6a shows the storage compartment having two movable side walls, which can be wound onto a respective roller, which is arranged under the compartment base, in a raised position and FIG. 6b shows the storage compartment having two movable side walls, which can be wound onto a respective roller, which is arranged under the compartment base, in a lowered position. FIG. 6a shows a schematic representation of two side walls 5a, 5b, which are guided under the compartment base 10 and which are made of flexible material or are configured as blinds, in a lowered position, wherein the side walls 5a, 5b are wound around two rollers 11a, 11b, which are arranged beneath the compartment base 10. The front and rear wall and the guide rails are not shown. The rollers 11a, 11b are arranged on or rotatable about axes 12a and 12b. In case of a manual mobility of the side walls 5a, 5b, this arrangement can be designed such that the rollers 11a and 11b can continue to rotate about the axes 12a and 12b. In case of an electromotive mobility of the side walls 5a, 5b, the rollers 11a, 11b may be fixedly attached to the axes 12a, 12b, respectively, so that the axes 12a, 12b can be moved by a respective electric motor. This makes it possible, for example, to transfer the side walls 5a, 5b into the raised position shown in FIG. 6b. In this case, the proportion of the side walls 5a, 5b, which is wound on the rollers 11a and 11b, is reduced accordingly. The guide of the side walls is performed by correspondingly shaped guide rails, which are not shown.

Figure 7:
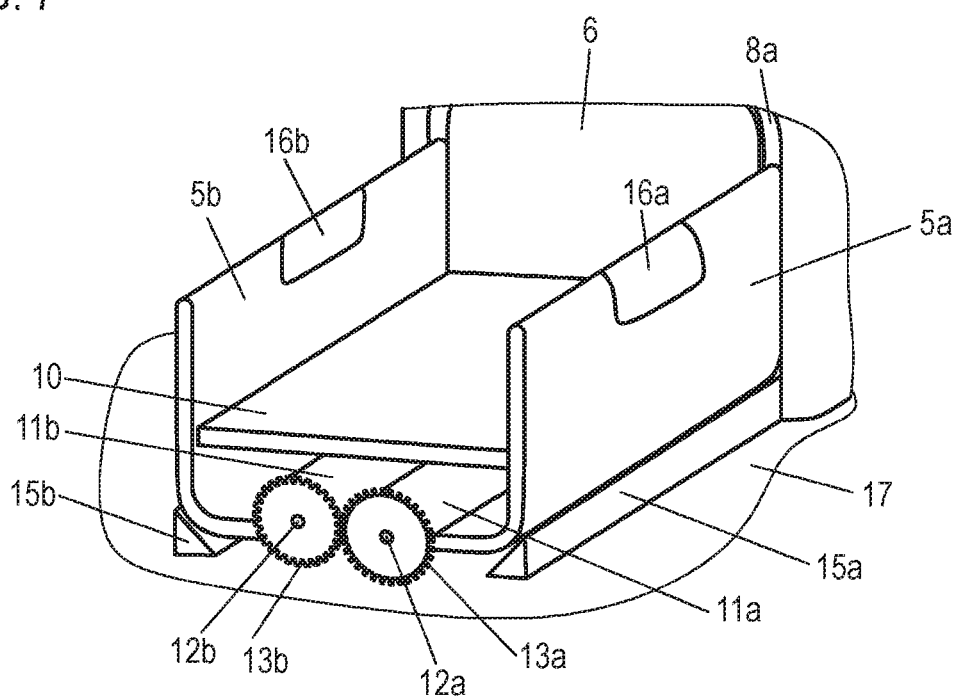
FIG. 7 shows a perspective, sectional view of a side compartment, in accordance with some embodiments.

FIG. 7 shows a perspective, sectional view of a side compartment, in accordance with some embodiments. FIG. 7 shows a perspective and sectional view of storage compartment, in which the side walls 5a, 5b are guided by a guide 8a, which is integrated into front wall 6. The rear wall 7 and the guide rail 8b are not shown. The side walls 5a, 5b are arranged on two rollers 11a, 11b, which are located under the compartment base 10. Also in this example, the deflection of the side walls 5a and 5b made of flexible material or configured as blinds takes place by means of correspondingly shaped guide rails. The rollers 11a, 11b are fixedly connected to the axes 12a, 12b. In addition, the axis 12a or the roller 11a is fixedly connected to the gear wheel 13a and the axis 12b or the roller 11b is fixedly connected to the gear wheel 13b. Cover strips 15a and 15b are provided between the bottom of the vehicle interior 17 and the side walls 5a and 5b. The gear wheels 13a, 13b provide a movable coupling of the two side walls 5a, 5b. The side walls 5a, 5b are provided with handles 16a and 16b for manual mobility. Due to the movable coupling of the rollers 11a, 11b, it is sufficient to manually operate one of the two side walls, in order to open or close the side walls.

Figure 8:
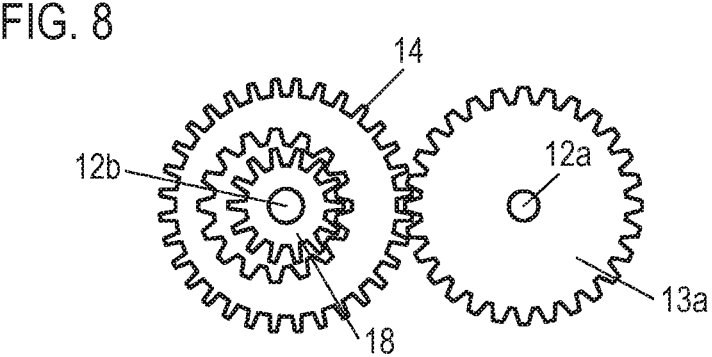
FIG. 8 shows a gear mechanism, in accordance with some embodiments.

FIG. 8 shows a gear mechanism, in accordance with some embodiments. FIG. 8 shows the gear mechanism used for motion coupling and a hollow gear stage. As shown in FIG. 8, a gear mechanism is provided for the movable coupling of two side walls. It consists of the gear wheel 13a arranged on the axis 12a, which meshes with the hollow gear 14. In a cavity of the hollow gear 14, the gear wheel 18, arranged on the axis 12b is provided. The number of teeth of the gears is selected so that the following applies: The number of teeth of the external gear of the hollow gear 14 is in the same proportion to the number of teeth of the gear wheel 13a as the number of teeth of the internal gear of the hollow gear 14 to the number of teeth of the gear wheel 18. This ensures a uniform loading of all the teeth of the gears. The gear wheels 13a and 18 and the hollow gear 14 may in this case, for example, be made of plastics material as an injection molded part, which enables cost-effective production, in particular of the hollow gear 14.

Figure 9:
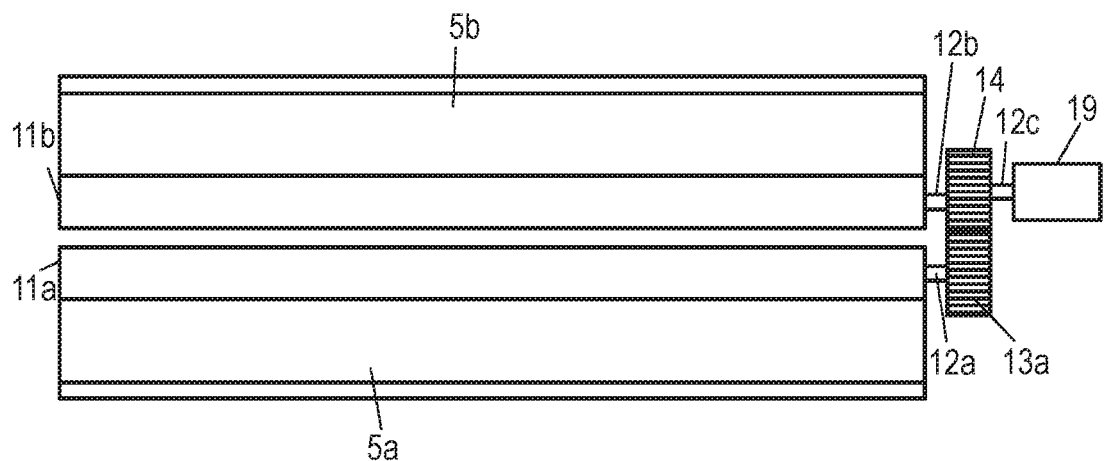
FIG. 9 shows a plan view of two side walls, in accordance with some embodiments.

FIG. 9 shows a plan view of two side walls, in accordance with some embodiments. Specifically, FIG. 9 shows the two side walls, which are movably coupled by means of a gear mechanism and which are partially wound on rollers. FIG. 9 shows two side walls 5a, 5b, which are wound on the rollers 11a, 11b. The compartment base and the side walls are not shown here. A movable coupling of the two side walls 5a and 5b is produced via the gear wheel 13a attached to the axis 12a and the gear wheel 18, which is arranged in the interior of the hollow gear 14 and which is fixed to the axis 12b. The hollow gear 14 is fixed, in this case, to the axis 12c, which can be driven at its other end by the electric motor 19. This arrangement allows a synchronous operation of the side walls 5a, 5b by using only one electric motor 19. The electric motor 19 is also connected to a control device (not shown) which in turn is connected to at least one control element, via which the vehicle occupant can change the position of the side walls 5a, 5b, for example, in order to open or to close the storage compartment, or to set a desirable height of the side walls.

Figure 10:
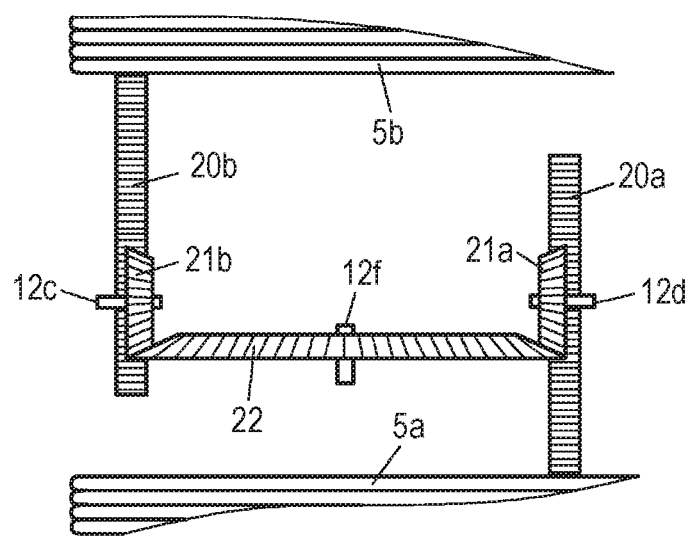
FIG. 10 shows a plan view of two side walls, in accordance with some embodiments.

FIG. 10 shows a plan view of two side walls, in accordance with some embodiments. Specifically, FIG. 10 shows the two side walls, which are movably coupled by means of rack gears and gears. FIG. 10 shows a movable coupling of the side walls 5a and 5b via the toothed rails 20a and 20b, which are fastened thereto. A movement coupling of the side walls 5a and 5b is achieved by the gear wheels 21a and 21b engaging the toothed rails 20a and 20b and by means of the bevel gear 22. The bevel gears 21a and 21b can be rotatably mounted on the axes 12d and 12e. The bevel gear 22 is rotatable about the axis 12f. In the arrangement shown in the figure, the side walls 5a and 5b designed as a blind having flexibly mounted blades can be manually moved. An additional electric motor can be mounted on the axis 12f, for example, in order to achieve the electromotive mobility.

The invention claimed is:

1. A motor vehicle, comprising:
at least two seats; and
a storage compartment located in a footwell in front of one of the at least two seats, wherein the storage compartment comprises:
a compartment base;
a front wall;
a rear wall; and
at least two side walls,
wherein at least one side wall of the at least two side walls is moveable in a lowered position for laterally opening the storage compartment, and
wherein the at least one side wall of the at least two side walls is moveable in a raised position for laterally closing the storage compartment.

2. The motor vehicle of claim 1, wherein the at least two side walls are movably coupled to each other.

3. The motor vehicle of claim 1, wherein the at least one side wall of the at least two side walls is guided within guide rails provided on the front wall and the rear wall.

4. The motor vehicle of claim 1, wherein each side wall of the at least two side walls is either rigid or flexible.

5. The motor vehicle of claim 1, wherein each side wall of the at least two side walls is made of a flexible material,
wherein each side wall of the at least two side walls is formed as a blind, and
wherein the blind comprises a plurality of blades, and each blade of the plurality of blades is movably fastened to another blade of the plurality of blades.

6. The motor vehicle of claim 1, wherein the at least one side wall of the at least two side walls deflects and moves over the storage compartment in response to the at least one side wall being moved into the raised position.

7. The motor vehicle of claim 1, wherein the at least one side wall of the two side walls slides under the compartment base or winds on a roll in response to the at least one side wall being moved into the lowered position.

8. The motor vehicle of claim 1, wherein the at least one side wall of the at least two side walls is moveable either manually or electromotively.

9. The motor vehicle of claim 1, wherein the at least one side wall of the at least two side walls comprises a handle.

10. The motor vehicle of claim 1, wherein the at least two side walls are movably coupled to each other by means of a gear mechanism.

11. The motor vehicle of claim 10, wherein the gear mechanism comprises:
one or more gear wheels; and
gear racks,
wherein the gear racks are connected to the at least two side walls, and
wherein the gear racks are coupled to each other by the one or more gear wheels.

12. The motor vehicle of claim 7, further comprising a gear mechanism, wherein the gear mechanism comprises:
a hollow gear stage; and
two rollers for winding the at least one side wall.

13. The motor vehicle of claim 1, further comprising a center console, wherein the front wall or the rear wall is integrated into the center console.

* * * * *